United States Patent [19]

Noguchi et al.

[11] 3,980,052

[45] Sept. 14, 1976

[54] FUEL SUPPLY INSTALLATION FOR INTERNAL COMBUSTION ENGINES

[75] Inventors: Masaaki Noguchi, Nagoya; Masaharu Sumiyoshi, Toyota, both of Japan

[73] Assignee: Toyota Jidosha Kogyo Kabushiki Kaisha, Japan

[22] Filed: Oct. 1, 1974

[21] Appl. No.: 510,915

[30] Foreign Application Priority Data

Dec. 21, 1973 Japan .................................. 49-1992

[52] U.S. Cl. .................................... 123/3; 123/1 A; 261/23 A; 48/180 R; 123/122 G; 123/127

[51] Int. Cl.$^2$ .................... F02M 33/00; F02B 43/10

[58] Field of Search ................. 261/23 A; 48/180 R; 123/122 G, 127, 1 A, 3, 121

[56] References Cited

UNITED STATES PATENTS

| | | | |
|---|---|---|---|
| 1,602,736 | 10/1926 | Woolson | 123/122 G |
| 1,609,296 | 12/1926 | Good | 123/122 G |
| 1,897,033 | 2/1933 | Garibaldi | 123/122 G |
| 2,057,808 | 10/1936 | Widegren | 123/122 G X |
| 2,225,647 | 12/1940 | Liekendael | 123/122 G |
| 2,915,377 | 12/1959 | Reichhelm | 123/122 G X |
| 3,068,085 | 12/1962 | Ensign et al. | 48/180 R X |
| 3,828,747 | 8/1974 | Nambu | 123/122 G X |

FOREIGN PATENTS OR APPLICATIONS

| | | | |
|---|---|---|---|
| 842,083 | 6/1939 | France | 123/3 |

*Primary Examiner*—Charles J. Myhre
*Assistant Examiner*—William C. Anderson
*Attorney, Agent, or Firm*—Stevens, Davis, Miller & Mosher

[57] ABSTRACT

A fuel supply installation is disclosed, which is constructed so that a novel means having an electric-spark ignition plug is provided underneath the intake manifold for generating a fuel vapor containing partially oxidized fuel components, and a connecting means between the fuel vapor generating means and the carburetor is also provided, which allows the produced fuel vapor to be sucked into the carburetor thereby mixing said fuel vapor with the mixture having a very large air-fuel ratio pre-established by the carburetor.

11 Claims, 5 Drawing Figures

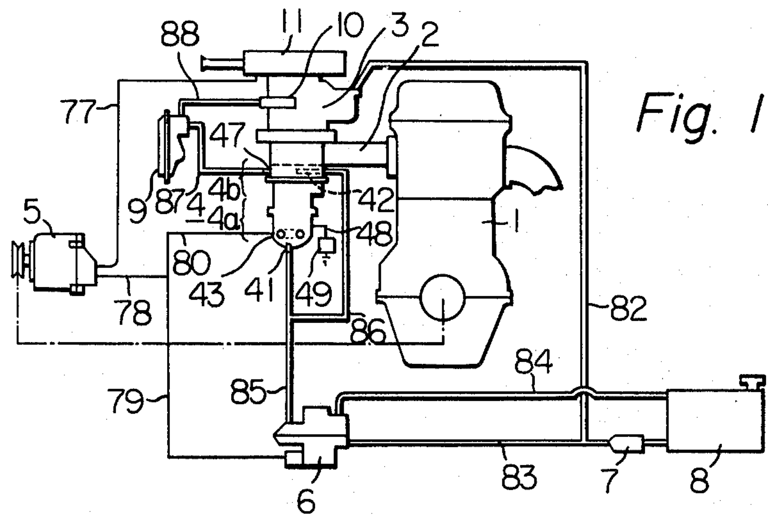
Fig. 1
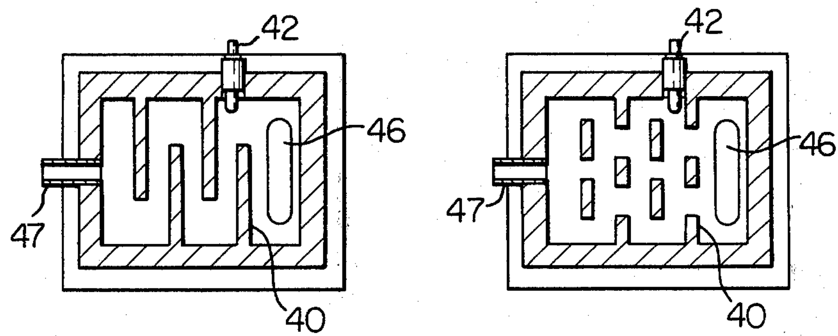
Fig. 3A
Fig. 3B
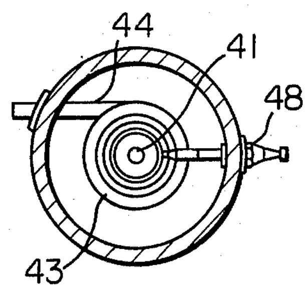
Fig. 4

FUEL SUPPLY INSTALLATION FOR INTERNAL COMBUSTION ENGINES

DESCRIPTION OF THE INVENTION

The present invention relates to a fuel supply installation for internal combustion engines, and more particularly relates to a fuel supply installation to supply an internal combustion engine with a very lean mixture through a carburetor, together with a fuel vapor containing partially oxidized fuel components, which is produced by combustion of a part of fuel within an additive fuel gas producer, thereby reducing harmful components in the exhaust gas emitted from the internal combustion engine.

Recently, the problem of air pollution due to the exhaust gas from internal combustion engines has become one requiring urgent solution. Diverse measures such as improvements in carburetors and engines, or developments of additional devices, namely thermal reacting devices or catalytic converters to reduce harmful components in the exhaust gases have been proposed. There has also been proposed a diferrent measure which was developed based upon the fact that an air fuel ratio has a direct effect on emissions in the exhaust gas. That is to say, this measure is aimed at reducing emissions by realizing so-called stratified combustion by providing two carburetors, main and secondary, and two combustion chambers, main and secondary. The main carburetor, intended to produce a lean mixture having a very large air fuel ratio, is connected to the main chamber, and the secondary carburetor, intended to produce a rich mixture having a very small air-fuel ratio, is connected to the secondary chamber. With this installation, the rich mixture is initially ignited by the spark plug attached to the secondary chamber, so that stratified combustion takes place, thus, causing the combustion of the lean mixture, which is so lean that it would not be ignited by a conventional spark ignition. Consequently, even if the average total air-fuel ratio between the main chamber and the secondary chamber is large, it can be burned with certainty.

A further measure has been proposed on the basis of a consideration similar to the last mentioned proposed measure, whereby a conventional carburetor is employed for producing an extremely lean mixture to which an appropriate amount of separate fuel, changed into a vapor form due to heating, is added to cause combustion of the totally lean mixture in the combustion chamber. In accordance with this proposed measure, emissions in the exhaust gas can thus also be suppressed.

As can be understood, the last two proposed measures proceed from the fact that if the mixture is lean, emissions of such harmful components as hydro-carbons, carbon monoxide and nitric oxide in the exhaust gas can be reduced. It should, therefore, be understood that in accordance with these proposed measures, stable combustion may be attained of lean mixtures of the kind often causing misfires in conventional internal combustion engines.

The main object of the present invention is to enable the lean mixture to expand its lean limit by adding a fuel vapor which contains partially oxidized fuel components, such as hydrogen, carbon monoxide and the like, thus, to reduce the emissions of harmful components under the stable combustion of the lean mixture mentioned above.

It is another object of the present invention to realize a novel fuel supply installation effective for reduction of the emissions even at cold starting conditions as well as during the warming-up operation of the engine, where said fuel vapor exchanges thermal energy with the mixture, until the effective thermal exchange takes place between the mixture and the heat riser underneath the intake manifold of the engine.

A further object of the present invention is to provide a fuel supply installation which is capable of being mounted on a motor vehicle in a relatively simple manner compared with the apparatus of conventional fuel supply equipment utilizing, e.g., a water shift reaction.

In order to attain the above objects, a fuel supply installation according to the present invention is constructed so that a novel means having an electric-spark ignition plug is provided underneath the intake manifold for generating a fuel vapor containing partially oxidized fuel components, and a connecting means between the fuel vapor generating means and the carburetor is also provided, which allows the produced fuel vapor to be sucked into the carburetor thereby mixing said fuel vapor with the mixture having a very large air-fuel ratio pre-established by the carburetor.

According to the present invention, the fuel supply installation is further provided with an appropriate pressure regulating means interposed between the ends of the connecting means for regulating pressure of the fuel vapor to a nearly atmospheric pressure level before said fuel vapor flows into the carburetor, so that the amount of the fuel vapor introduced into the carburetor is proportional to the amount of air sucked from the atmosphere into the carburetor.

According to the present invention, the fuel supply installation is so constructed that the air-fuel ratio of the additive fuel vapor is adjusted by a thermal compensation means which senses the temperature of the internal combustion engine, and adjusts the amount of liquid fuel supplied to the fuel vapor generating means accordingly.

The above and other objects, features and accompanying advantages of the present invention will become apparent from the ensuing description taken in connection with the accompanying drawings which show, for purposes of illustration only, a typical embodiment according to the present invention, and wherein:

FIG. 1 is a schematic view of a fuel supply installation in accordance with the present invention;

FIG. 3A is a cross-sectional view taken along the line III—III of FIG. 2, which illustrates the construction of the thermal exchanging fins of the intake manifold;

FIG. 3B is a view similar to FIG. 3A, which illustrates another embodiment of the construction of the thermal exchanging fins of the intake manifold;

FIG. 4 is a cross-sectional view taken along the line IV—IV of FIG. 2.

Figure 2:
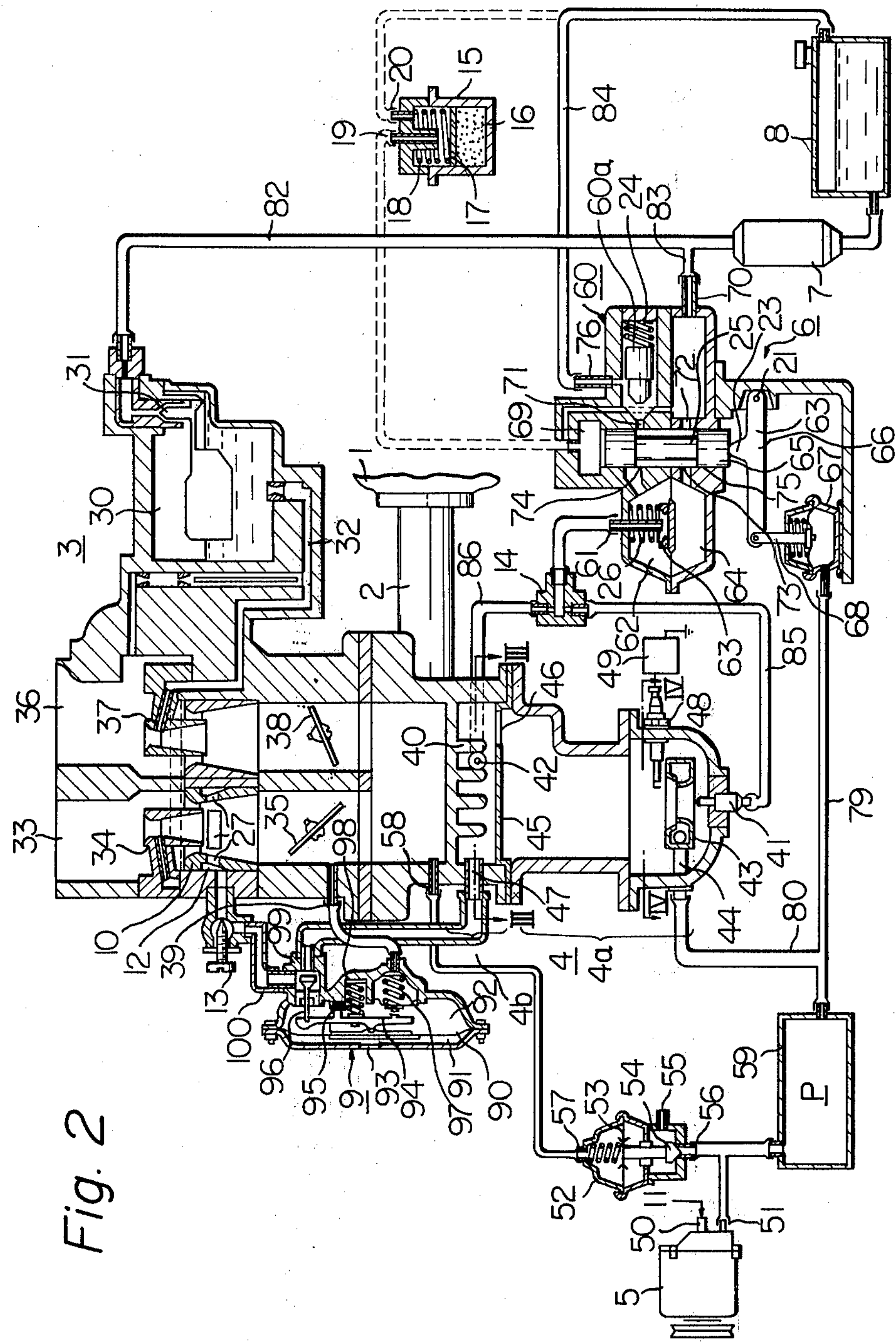
FIG. 2 is a cross-sectional view, on an enlarged scale, and in part a schematic view, of the fuel supply installation of FIG. 1.

Referring to FIG. 1, reference numeral 1 designates a multi-cylinder type internal combustion engine serving for the drive of a vehicle. Reference numeral 2 designates an intake manifold on which a carburetor 3 is mounted. An air pump designated by reference numeral 5 is provided with a mechanical association with and driven by the internal combustion engine 1, the mechanical association being shown by a broken line. Reference numeral 6 is a fuel flow control device, 7 is a fuel pump, 8 is a fuel tank, 9 is a pressure regulator, 10 is an additive fuel feeder and 11 is an air cleaner. An additive fuel vapor generator generally designated by reference numeral 4 is constituted by a combustion barrel 4*a* and a mixing barrel 4*b*. The combustion barrel 4*a* of the additive fuel vapor generator 4 is provided with a first fuel liquid supply nozzle 41, an air injector 43 and a spark ignition plug 48. The mixing barrel 4*b* of the additive fuel vapor generator is provided with the second fuel liquid supply nozzle 42 and an outlet pipe 47 connected to the side of the mixing barrel 4*b*.

When the internal combustion engine 1 starts its operation, the air pump 5 and the fuel pump 7 simultaneously come into operation. The air pump 5 pumps the air from the atmosphere through the air cleaner 11 and an air line 77, and supplies the pumped air to the fuel flow control device 6 and to the air injector 43 through air lines designated by reference numerals 78, 79 and 80. The fuel pump 7 distributes the liquid fuel (gasoline) stored in a fuel tank 8 to the float chamber of the carburetor 3 via a fuel supply line 82, and to the fuel flow control device 6 via a fuel supply line 83. The fuel flow control device 6 supplies the first fuel liquid supply nozzle 41 and the second fuel liquid supply nozzle 42 with the liquid fuel, which is fed from the fuel pump 7, via fuel supply lines 85 and 86. In this case, it should be noted that the fuel flow control device 6 controls the amount of the liquid fuel supplied to both fuel liquid supply nozzles 41 and 42 so that said amount is proportional to the amount of air supplied to the air injector 43 from the air pump 5. In the additive fuel vapor generator 4, the fuel injected in the combustion barrel 4*a* from the first fuel liquid supply nozzle 41 is mixed with the air injected from the air injector 43, and the air-fuel mixture is subsequently fired by an electric spark of the ignition plug 48. then, the air-fuel mixture burns in the combustion barrel 4*a*, and the resultant combustion gases in the combustion barrel 4*a* flow up into the mixing barrel 4*b* through an opening (not shown in FIG. 1) formed in a partition between the combustion and mixing barrels 4*a* and 4*b*. When the combustion gases flow into the mixing barrel 4*b*, they vaporize the liquid fuel injected from the second fuel liquid supply nozzle 43. When the liquid fuel is vaporized, a part of the fuel also undergoes thermal decomposition due to the thermal energy exhibited by the combustion gases from the combustion barrel 4*a*. As a result, in the mixing barrel 4*b*, a fuel vapor containing partially oxidized fuel components, such as hydrogen, carbon monoxide and the like, is produced. This fuel vapor then flows through an outlet tube 47 and line 87 into the pressure regulator 9 having effected the thermal exchange action while passing underneath the intake manifold 2. In this case, the conditions should preferably be selected so that the temperature of the fuel vapor reaches about 200° centigrade. The pressure regulator 9 serves to regulate or reduce the pressure of the fuel vapor supplied therein to a nearly atmospheric pressure level. Subsequently, the regulated fuel vapor flows through a line 88 into the additive fuel vapor feeder 10, which is additionally provided adjacent to the venturi of the carburetor 3 in accordance with the present invention. As a result, fuel vapor having nearly atmospheric pressure is sucked into the carburetor 3 through the feeder 10 due to the suction action of the negative pressure produced in the carburetor 3 which pressure depends upon the rotation of the internal combustion engine 1. While in the carburetor 3, a mixture is produced from the liquid fuel supplied from the float chamber of the carburetor 3 and the air introduced from the air cleaner 11, in the same manner as in conventional carburetors. However, it should be noted that the air-fuel ratio of the mixture produced by this carburetor 3 is set at a pre-established level of between 20 and 40. That is to say, it should be understood that the mixture produced in the carburetor 3 is very lean compared with the mixture produced in conventional carburetors. This lean mixture is further mixed with the above-mentioned fuel vapor sucked through the additive fuel vapor feeder 10. In the course of mixing, the thermal energy in the fuel vapor serves to promote complete vaporization of the fuel droplets suspended in the lean mixture. As a result, the mixture of the lean mixture produced in the carburetor 3 and the fuel vapor is changed into a homogeneous mixture before said mixture flows into the intake manifold 2. Thus, it will be understood that a homogeneous mixture which includes a completely vaporized fuel component is fed into the multicylinder type internal combustion engine 1, via the manifold 2.

From the above-mentioned arrangement, it will further be understood that mixing of the fuel vapor and the mixture coming from the carburetor 3 is carried out at full range from low speed to high speed operations of the internal combustion engine 1. However, if desired, it is possible to employ another arrangement in which a two barrel type carburetor is employed for the carburetor 3, and the low speed barrel of the two barrel-type carburetor is furnished with only the additive fuel feeder 10 whereby the fuel vapor from the additive fuel feeder 10 is only mixed with air during low speed and small load operation of the internal combustion engine 1, and during high speed and large load operation of the engine 1, the fuel vapor is mixed with the mixture coming from the high speed barrel of the two barrel-type carburetor. The decision as to which of these two carburetor arrangements should be employed depends upon the type of operation of an internal combustion engine.

From the foregoing, it will be understood that although the carburetor 3 produces a lean mixture which would cause misfiring in conventional internal combustion engines, the combustion of the very lean mixture can be realized very stably due to the effect exhibited by the partially oxidized fuel components within the fuel vapor, and also due to the fact that equal distribution of the lean mixture to every cylinder of the engine 1 results from the above-mentioned promotion of vaporization of the fuel droplets within the mixture from the carburetor 3. Also, since the mixture burned is maintained extremely lean, it is quite obvious that the emissions from the engine 1 are remarkably low.

Referring now to FIG. 1, in which the reference numerals as used in FIG. 1 are used to designate identical paarts, it should be noted that the carburetor 3 is constructed as a two barrel type carburetor which is provided with a first passageway 33 for low speed and small loads, and a second passageway 36 for high speed and large loads. The first passageway 33 is provided with a first small venturi 34 and a first throttle valve 35, while the second passageway 36 is provided with a second small venturi 37 and a second throttle valve 38. Reference numeral 30 designates a float chamber into which the liquid fuel is supplied from the fuel tank 8 via the fuel pump 7. The amount of the liquid fuel supplied into the float chamber 30, is controlled by a needle valve 31, associated with the float, which moves up and down in response to the movement of the liquid fuel level within the float chamber 30. The liquid fuel within the float chamber 30 is supplied to the above-mentioned small venturi 34 and 37 through a fuel passageway 32. As previously described, the mixture produced by the two barrel type carburetor 3 is also pre-established at an air-fuel ratio of between 20 and 40. As seen from FIG. 2, the additive fuel vapor generator 4 is constituted by the combustion barrel 4*a* having the shape of hollow tubular body, and the mixing barrel 4*b*. The combustion barrel 4*a* is provided with the air injector 43 which is disposed so as to lie in the plane perpendicular to the axis of the combustion barrel 4*a*, and the first fuel liquid supply nozzle 41, which is disposed adjacent to the air injector 43 so as to be in alignment with the axis of the combustion barrel 4*a*. The combustion barrel 4*a* is further provided with the ignition plug 48 extending into the barrel 4*a* in a direction perpendicular to the axis of the combustion barrel 4*a*. Reference numeral 49 designates an electric igniter supplying the ignition plug 48 with a high potential, and having a construction similar to that of conventional ignition plugs of the conventional engine but without a conventional distributor. The air injector 43, as shown in detail in FIG. 4, comprises an annularly shaped tube having openings formed on the inner most side surface of the tube, and an air supply tube 44 which is attached to the annularly shaped tube and extends in a tangential direction from the annularly shaped tube. The mixing barrel 4*b* is arranged above the combustion barrel 4*a*, and is connected to the combustion barrel 4*a* via a partition 45 which has an aperture 46 formed in a peripheral portion of the partition 45. The partition 45 vertically faces the outer wall of the collecting portion of the intake manifold 2, and the outer wall of the intake manifold 2 is provided with thermal exchanging fins 40 extending vertically and downwardly from the surface of the outer wall. The vertical side walls of the mixing barrel 4*b* are constructed by the outermost vertical extensions from the intake manifold 2, and provided with the second fuel liquid supply nozzle 42 and the outlet tube 47. The preferred arrangements of the thermal exchanging fins 40 within the mixing barrel 4*b* are shown in FIGS. 3A and 3B.

The air pump 5 inhales air through a suction inlet 50, and the air is pumped out through a pump outlet 51 toward an air control valve unit 52 and a surge tank 59 for absorbing the fluctuation in the pressure of the air. The air control valve unit 52 is provided for controlling the amount of air supplied to the surge tank 59 in response to the magnitude of the negative pressure within the intake manifold 2. The air control valve unit 52 is provided with: a diaphragm 53, undergoing appropriate depression by a coil spring; a valve 54, attached to the diaphragm 53 by a valve rod; a negative pressure port 57 which communicates to the intake manifold 2 through the negative pressure port or pipe 58 and transmits the negative pressure to a diaphragm chamber defined above the diaphragm 53, and; a release port 55 opening toward the atmosphere. In the air control valve unit 52, the valve 54 moves up from its lower-most position in response to the extent of the negative pressure within the diaphragm chamber, and the amount of air flowing into the atmosphere through the release port 55 is controllably changed in response to the amount of lift of the valve 54 from the lowermost position. Consequently, regulation of the amount of air supplied from the air pump 5 to the surge tank 59 is conducted in response to the amount of air escaping from the release port 55 of the air control valve unit 52.

The fuel flow control device 6 is provided with a diaphragm unit 67 in which a rod 68, connected to the diaphragm of the unit 67, is disposed so as to move up and down depending upon the amount of air supplied from the surge tank 59 into the unit 67 through the air line 79. The fuel flow control device 6 is also provided with an arm 66 which has one end pivotally connected to the rod 68, the other end turnable with respect to the fulcrum 21, and a projection 23 formed at the intermediate portion of the arm 66. The projection 23 of the arm 66 contacts a piston 65 which moves up and down in response to the turning motion of the arm 66 with respect to the fulcrum 21. The motion of the piston 65 is carried out so that the piston 65 slides in the interior of the control body 75 in which three round ports 71, 72 and 73 and an extended port 74 are bored. The liquid fuel supplied by the fuel pump 7 is introduced into the fuel flow control device 6 through a fuel inlet port 70. The liquid fuel is subsequently fed into a pressure chamber 69 thereby depressing the piston 65 and, simultaneously, the liquid fuel is fed into the control body 75 through the round port 72. The liquid fuel is fed into the control body 75, then, flows through an annular gap 25 formed between the smaller diameter portion of the piston 65 and the internal wall of the control body 75 and is introduced through the round port 71 into a relief valve 60. The predetermined pressure of the liquid fuel introduced into the relief valve 60 is established by a spring force which is exerted on the valve body 60*a* by a coil spring 24. That is to say, the valve body 60*a* is positioned so that the pressure force of the liquid fuel in the relief valve 60 and the spring force exhibited by the coil spring 24 are balanced. As a result, the remainder of the liquid fuel fed into the relief valve 60 returns through the fuel return line 84 to the fuel tank 8. The liquid fuel in the control body 75 is also fed through the annular gap 25 to the round port 73 as well as the extended port 74. The extended port 74 serves to control the amount of the liquid fuel flowing therethrough, since the opening area of this extended port 74 is adjusted by the larger diameter portion of the piston 65 when said piston 65 moves up and down. Reference numerals 61 through 64 designate elements for carrying out a function such that the above-mentioned controlling of the amount of the liquid fuel flowing through the extended port 74 takes place at a constant differential pressure, and also the pressure of the fuel liquid exhausted from the tube 61 is maintained within a required pressure range. That is to say, through the extended port 74, the liquid fuel is introduced into a first diaphragm chamber 62 so as to fill the chamber 62 and, subsequently, exhausted through the tube 61, while the liquid fuel is introduced, through the round port 73, into and fills a second diaphragm chamber 64. The differential pressure between the first diaphragm chamber 62 and the second diaphragm chamber 64 is always kept constant by the relationship between the distance from the tube 61 to a plate membr 63 and the spring force of a coil spring 26, but the pressure of the liquid fuel exhausted from the tube 61 depends upon the amount of the liquid fuel flowing through the tube 61, the extent of the pressure being sufficient to overcome the flow resistances exerted by the fuel supply lines running from the tube 61 to both nozzles 41 and 42. Reference numeral 14 in FIG. 2 designates a fuel distributor which is provided with two metering orifices. The fuel distributor 14 distributes the liquid fuel exhausted from the tube 61 of the fuel flow control device 6 to the first and second fuel liquid supply nozzles 41 and 42 at an appropriate ratio, determined by the two metering orifices. Reference numeral 15 designates a thermal compensator which is disposed in the intermediate of the passageway for cooling water of the internal combustion engine 1. The thermal compensator 15 is provided with a tube 19 into which the liquid fuel is fed from the pressure chamber 69 of the fuel flow control device 6, and a tube 20 through which the liquid fuel fed into the tube 19 returns to the fuel tank 8. In the thermal compensator 15, thermal expansion and contraction of a temperature sensitive wax 16 causes a disc 17 to move up and down, respectively, thereby changing the distance between the tube 19 and the disc 17. This change in the distance between the tube 19 and the disc 17 causes a change in the pressure of the liquid fuel within the pressure chamber 69. From this fact, it will be understood that the pressure of the liquid fuel within the pressure chamber 69 finally varies in response to changes in the temperature of the internal combustion engine 1, whereby the fuel flow control by the fuel flow control device 6 undergoes thermal compensation by the thermal compensator 15.

The pressure regulator 9 is provided with first and second diaphragm chambers 91 and 92 at opposite sides of a diaphragm 90. The first diaphragm chamber 91 is provided with an opening 93 which opens toward the atmosphere, while inside the second diaphragm chamber 92 are provided diverse control elements designated by reference numerals 94 through 98, and explained hereinafter. An arm 94 is arranged to be turnable with respect to a fulcrum 95. One side of the arm 94 is pressed by a coil spring 98 disposed, in FIG. 2, under the fulcrum 95, while the opposite side of the arm 94 is provided with a part contacting the diaphragm 90, as shown in FIG. 2. One end of the arm 94, that is, the upper end in FIG. 2, is pivotally connected to a valve 96. The valve 96 is provided for controlling the opening area of an additive fuel vapor inlet 99, in response to the turning motion of the arm 94. As will be understood from FIG. 2, the internal pressure of the second diaphragm chamber 92 is kept equal to a negative pressure of the first venturi 34 of the carburetor 3 during operation of the internal combustion engine, since the negative pressure is transmitted to the second diaphragm chamber 92 through an additive fuel vapor outlet 100. When the internal pressure of the second diaphragm chamber 92 becomes negative, the diaphragm 90 moves toward the second diaphragm chamber 92 until the elastic force exhibited by the shifted diaphragm 90 becomes equal to the difference between the negative pressure in the second diaphragm chamber 92 and the atmospheric pressure in the first diaphragm chamber 91. The movement of the diaphragm 90 causes a turning motion of the arm 94 against the spring force of the coil spring 98, with respect to the fulcrum 95. Thus, in response to the turning motion of the arm 94, the opening area of the additive fuel vapor inlet is controlled by the valve 96 whereby the amount of the additive fuel vapor, which is supplied to the additive fuel vapor feeder 10 through the additive fuel vapor outlet 100, can be controlled in response to the magnitude of the negative pressure in the carburetor 3. It should be understood that a diaphragm unit 97 is provided as a kind of safety device. That is, when the internal combustion engine starts, a negative pressure produced in the intake manifold 2 is immediately transmitted to the diaphragm chamber of the unit 97 through a negative pressure port 39. As a result, the diaphragm of this unit 97 moves in the right-hand direction in FIG. 2 so as to allow the turning motion of the arm 94. Contrary to this, when the internal combustion engine 1 stops its operation, the diaphragm of the diaphragm unit 97 immediately moves in the left-hand direction in FIG. 2 so as to let the arm 94 turn in the clockwise direction in FIG. 2, thereby providing a tight connection between the valve 96 and the additive fuel vapor inlet 99 in order to prevent the flowing of the additive fuel vapor.

The additive fuel vapor feeder 10 is constituted by a barrel body which is fitted in the first venturi 34 of the carburetor 3, and defines an annular chamber 12 between the barrel body and the inner wall of the first passageway 33. Thus, the additive fuel vapor supplied through the additive fuel vapor outlet 100 via an adjustable screw 13, is introduced into the annular chamber 12 of the additive fuel vapor feeder 10. Subsequently, the additive fuel vapor in the annular chamber 12 is sucked into the carburetor 3 through extended holes 27 which connect between the annular chamber 12 and the first passageway 33 at the part just under the first venturi 34.

The operation of the fuel supply installation of FIG. 2 will hereinafter be explained.

When the internal combustion engine 1 starts, the air pump 5 associated with the crank shaft of the engine 1 begins to rotate, and supplies the surge tank 59 with the air. A negative pressure in the intake manifold 2 is simultaneously transmitted to the air control valve unit 52 through a negtive pressure hole 58, so that the valve 54 opens the control port 56 against the spring force, thereby allowing the air pumped by the air pump 5 to escape into the atmosphere through a release port 55. As a result, the pressure "P" of the air within the surge tank 59 is changed in response to the number of the revolutions of the crank shaft or the engine speed as well as to the level of negative pressure in the intake manifold 2, that is, the magnitude of the load of the engine 1. The amount of the air which is supplied from the surge tank 59 to the additive fuel vapor generator 4 and to the fuel flow control device 6 is proportional to the square root of the value of the air pressure P within the surge tank 59. As a result, the piston 65 of the fuel flow control device 6 exhibits, in the control body 75, a sliding motion, the magnitude of which is corresponding to the amount of air supplied to the fuel flow control device 6.

When the internal combustion engine 1 starts, the fuel pump 7 comes into operation and supplies the fuel inlet port 70 of the fuel flow control device 6 and the needle valve 31 of the carburetor 3 with the liquid fuel in the fuel tank 8. The liquid fuel supplied to the needle valve 31 is stored in the float chamber 30. Subsequently, the fuel in the float chamber 30 is sucked toward the engine 1, due to the rotation of the engine 1, through the small venturi 34 and 37. The liquid fuel supplied to tthe fuel flow control device 6 is introduced, through the fuel inlet port 70, into the pressure chamber 69 and into the control body 75 via the round port 72. Subsequently, the fuel in the control body 75 flows through the annular gap 25, round ports 71 and 73, and the extended port 74 into the relief valve 60, the second diaphragm chamber 64, and the first diaphragm 62, respectively. As explained previously, the relief valve 60 serves to maintain the constant pressure of the liquid fuel, since in the case where the pressure of the liquid fuel becomes abnormally high, the relief valve 60 removes fuel to the fuel tank 8 through the return port 76. The amount of fuel flowing into the first diaphragm chamber 62 can be set always substantially proportional to the amount of air supplied from the surge tank 59 to the diaphragm unit 67, by selecting the shape of the port 74 suitably or making the porjection 23 of the arm 67 at the fixed cam shape, since the amount of the fuel flowing from the control body 75 into the first diaphragm chamber 62 through the extended port 74, is always regulated by the opening area of the port 74 which is controlled by the larger diameter portion of the piston 65, exhibiting a sliding movement corresponding to the amount of air from the surge tank 59. As a result, it will be understood that the amount of fuel flowing into the first diaphragm chamber 62 depends upon the number of revolutions of the engine 1 and the load applied to said engine 1. The fuel in the first diaphragm chamber 62 is exhausted through the tube 61, and flows into the fuel distributor 14. Then, the fuel is distributed to the first and second fuel liquid supply nozzles 41 and 42 of the additive fuel vapor generator 4 at a predetermined distribution ratio. While the fuel is exhausted from the first diaphragm chamber 62, the internal pressure of the chamber 62 is kept at such a level that the compounded pressure reduced due to the exhaustion of the fuel from the tube 61, and the spring force exerted by the spring 26 is in equilibrium with the internal pressure of the second diaphragm chamber 64. However, since the reduced pressure component due to the exhaustion of the fuel from the tube 61 is very small, and, therefore, can be ignored, it should be understood that the internal pressure of the chamber 62 is kept at a constant value smaller than the value of the internal pressure of the chamber 64, by an amount of pressure corresponding to that effected by the spring 26. Thus, the amount of the liquid fuel exhausted through the tube 61 can be made always proportional to the flow amount of the air supplied from the surge tank 59.

In the additive fuel vapor generator 4, the air supply tube 44 is furnished with air from the surge tank 59, while the first and second fuel supply nozzles 41 and 42 are furnished with liquid fuel. The air fed into the air supply tube 44 advances tangentially in the annularly shaped air injector 43, and is subsequently injected through the round openings of the air injector 43 into the combustion barrel **4*a*. This injected air is, then, mixed with the fuel injected from the first fuel liquid supply nozzle 41 so as to produce a mixture. The mixture is fired by an electric spark of the ignition plug 48 which is operated by the igniter 49, so that the mixture carries out combustion in the combustion barrel 4*a*. In the combustion process, a part of the combustion gases returns to the first fuel liquid supply nozzle 41 while passing the outside of the annularly shaped air injector 43, and the heating nozzle 41. This recirculation of a part of the combustion gases occurs because the pressure of the burning portion becomes higher than that of the air injecting portion in the combustion barrel 4*a*. Thus, the fuel injected from the nozzle 41 is immediately vaporized so that the vaporized fuel is homogeneously mixed with the air injected from the air injector 43 to provide a stable combustion. The combustion gases advance into the mixing barrel 4*b* through the opening 46 of the partition 45. In the mixing barrel 4*b*, the combustion gases undergo a thermal exchange which heats up the intake manifold 2 when said gases contact the thermal exchange fins 40. The combustion gases are also mixed with the liquid fuel injected from the second fuel liquid supply nozzle 42, and vaporize said fuel. In the course of vaporizing said fuel, the flames of the combustion gases are extinguished, and a part of the fuel simultaneously undergoes a thermal decomposition so that a fuel vapor containing partially oxidized components (hydrogen, carbon monoxide, etc.) is produced, that is to say, an additive fuel is produced. The produced fuel vapor flows toward the outlet tube 47. In this case, the temperature of the produced fuel vapor should preferably be about 200° centigrade when the vapor passes through the outlet tube 47**.

It should be understood that if the mixture made from the air from the air injector 43 and the liquid fuel injected by the first fuel liquid supply nozzle 41, has the theoretical air-fuel ratio, the rate of heat generation will become maximum. However, in accordance with the technical concept of the present invention, the fuel vapor which is additively supplied to the carburetor 3, should preferably contain not only the smallest possible amount of unburned components but also the largest possible amount of partially oxidized fuel components. Therefore, it is not always necessary that the above-mentioned rate of heat generation become maximum. For example, in an extreme case, it is possible to adopt an arrangement in which the fuel injection from the second fuel liquid supply nozzle 42 is completely stopped and the first fuel liquid supply nozzle 41 only is permitted to inject the liquid fuel. That is, for example, if the fuel is injected from only the first liquid supply nozzle 41 (the injection from the second nozzle 42 being of course stopped) so that the air-fuel ratio is kept at 3, a small amount of the fuel initially contacts the air which is injected from the air injector 43, and the remaining fuel injected from the nozzle 41 is vaporized by the heat produced during combustion of the small amount of fuel. As a result, in the combustion barrel **4*a*, a rich fuel mixture consisting of the combustion gases, the fuel vapor and the residual air and having a small air-fuel ratio close to 3 is generated. Due to the fact that the air-fuel ratio is small, the flame produced during combustion is immediately extinguished so as to stop propagation of the combustion process, and the fuel vapor only is finally produced. Therefore, it will be understood that adoption of the above described arrangement is fully consistent with the aim of the present invention. However, in the case of the above-mentioned arrangement adopting the air-fuel ratio 3, the internal temperature of the mixing barrel 4*b* does not reach more than 200° centigrade. Thus, the occurrence of partial oxidization of the fuel due to thermal energy is not promoted. As a result, the purpose of obtaining the fuel vapor may be attained, but the requirement for obtaining a sufficient amount of partially oxidized fuel components is not satisfied. In order to obtain a sufficient amount of partially oxidized fuel components, it is necessary to select the value of the air-fuel ratio so that the internal temperature of the mixing chamber 4*b* is not less than 500° centigrade. However, it should be appreciated that the air-fuel ratio of the fuel vapor containing partially oxidized fuel components may be established at any required value by appropriately selecting the amount of liquid fuel to be injected from the first and second fuel liquid supply nozzles 41 and 42 together with the amount of air to be supplied by the surge tank 59.**

The fuel vapor produced in the additive fuel vapor generator 4 is subsequently supplied to the inlet 99 of the pressure regulator 9. As has been explained previously, when the internal combustion engine 1 starts, a negative pressure in the intake manifold 2 is transmitted to the diaphragm unit 97 of the pressure regulator 9 through the port 39 so as to cause movement of the diaphragm of the diaphragm unit 97 in the right-hand direction in FIG. 2. A negative pressure produced in the additive fuel vapor feeder 10 is simultaneously transmitted to the second diaphragm chamber 92 so as to cause movement of the diaphragm 90 in the right-hand direction in FIG. 2. As a result, the arm 94 turn in the counterclockwise direction in FIG. 2 with respect to its fulcrum 95, thereby displacing the valve 96 in the left-hand direction in FIG. 2 so that the additive fuel vapor inlet 99 opens. From the opened inlet 99, the fuel vapor containing partially oxidized fuel components flows into the pressure regulator 9, and subsequently flows through the outlet 100 toward the adjustable screw 13 which is provided for controlling the amount of fuel vapor fed to the additive fuel vapor feeder 10. When the fuel vapor reaches the feeder 10, it is sucked into the carburetor 3 due to the negative pressure therein. During supply of the fuel vapor from the fuel vapor feeder 10, the internal pressure of the second diaphragm chamber 92 increases and the diaphragm 90 is displaced in the left-hand direction in FIG. 2. Thus, the arm 94 turns in a clockwise direction in FIG. 2, thereby moving the valve 96 toward the additive fuel vapor inlet 99 until the pressure within the second diaphragm chamber 92 is in equilibrium with the pressure within the first diaphragm chamber 91, that is, the atmospheric pressure. As a result, the pressure of the additive fuel vapor which is supplied to the additive fuel vapor feeder 10, is controlled to equalize atmospheric pressure. Due to this adjustment, the fuel vapor in the feeder 10 is sucked into the carburetor 3 because of the negative pressure produced at the venturi portion of the feeder 10, the amount of sucked fuel vapor being proportional to the amount of air introduced into the carburetor 3 from the atmosphere through the air cleaner 11. The temperature of the fuel vapor is lowered when the fuel vapor is mixed with the lean mixture produced by the small venturi 34. During the mixing of the fuel vapor with the lean mixture, vaporization of the fuel droplets suspended in the lean mixture is accelerated by the heat of the fuel vapor, and the mixture entering the combustion chambers of the internal combustion engine is made homogeneous.

The thermal compensator 15 is provided for controlling the air-fuel ratio of the additive fuel vapor on the basis of the direct or indirect detection of the temperature of the internal combustion engine 1. Indirect detection of the temperature of the engine 1 can be effected, for example, by testing the temperature of the cooling water. When the temperature of the engine 1 increases, the temperature sensitive wax 16 in the thermal compensator expands, thereby lifting the disc 17 against the spring force of the spring 18 so that the disc 17 approaches the tube 19. As a result, the pressure within the pressure chamber 69 of the fuel flow control device 6 is increased so as to restrain the upward movement of the piston 65. The opening area of the extended port 74 is thus comparatively smaller than when the temperature of the engine 1 is low, i.e., when the engine is in cold operation, consequently, reducing the supply of liquid fuel to the additive fuel vapor generator 4, and increasing the air-fuel ratio thereof.

From the above description of the thermal compensator 15, it should be appreciated that when the internal combustion engine 1 is started under cold conditions, or while the engine 1 is warming-up, the rate of supply of the fuel vapor can be increased (the air-fuel ratio of the fuel vapor is decreased). After warming-up of the engine 1, the rate of supply of the fuel vapor can of course be returned to a normal value. Thus, the elimination of the convention choke device can be effected. It should further be understood that the thermal compensator 15 is shown as a preferred embodiment and, therefore, the thermal compensator 15 may be replaced by, e.g., a conventional bi-metallic device. It will also be understood that an altitude compensator having the same construction as the thermal compensator 15 may be interposed between the ends of the conduit as shown by a dotted line in FIG. 2.

From the foregoing description, it will be appreciated that in accordance with the fuel supply installation of the present invention, the very lean mixture which consists of an extremely lean mixture produced in a carburetor and a fuel vapor containing partially oxidized fuel elements, produced by an additive fuel vapor generator, is supplied to a multi-cylinder type internal combustion engine, so that harmful components such as hydrocarbon, carbon monoxide and nitric oxide in the exhaust gases can be appreciably reduced by the advantageous effect exhibited by the partially oxidized fuel components as well as by the fact that the mixture containing sufficiently vaporized fuel components is distributed equally to all cylinders in the internal combustion engine. Thus, it will also be appreciated that the use of the present invention in internal combustion engines provides an effective preventive measure.

Further, in accordance with the present invention, in addition to the aditive fuel vapor, the thermal exchange taking place at the thermal exchange fins 40 of the intake manifold 2 is capable of limiting the emission of hydrocarbon and carbon monoxide. Thus, the harmful components in the exhaust gases can be reduced even when the internal combustion engines are started under cold conditions or while warming-up.

Still further, in accordance with the present invention, the combustion of the lean mixture, so lean that it would cause misfiring in conventional internal combustion engines, is stably carried out, therefore, providing for economical operation of an internal combustion engine.

Also, the mounting of the fuel supply installation of the present invention onto a vehicle is appreciably simple compared with fuel supply equipment which has a water tank for adopting the chemical art of a water shift reaction.

In the foregoing description, an internal combustion engine 1 provided with a usual carburetor 3 is explained. However, the fuel supply installation of the present invention may be incorporated in a secondary carburetor for producing a rich mixture, which is provided for so-called stratified combustion engines. Also, the fuel supply installation of the present invention may be incorporated in rotary engines. In such variations, the carburetor 3 will be replaced by a secondary carburetor for the stratified combustion engines or a carburetor for rotary engines.

What is claimed is:

1. A fuel supply installation for internal combustion engines, in which a fuel tank and a carburetor for producing an attenuated air fuel mixture are connected by a first fuel supply line, and the carburetor is mounted on an intake manifold which is provided with opposite multiple delivery branches connectable to an internal combustion engine, comprising means for generating a fuel vapor containing partially oxidized fuel components, said fuel vapor generating means comprising a barrel having therein a space closed from the atmosphere, an air injecting means provided for injecting air into the space of the barrel, a fuel liquid supply nozzle supplying the space of said barrel with a liquid fuel fed from the fuel tank through a second fuel supply line, an ignition plug for providing an electric spark which causes combustion of the liquid fuel in the barrel with the aid of the air from the air injector thereby to cause generation of said fuel vapor containing partially oxidized fuel components in said barrel, and conduit means for carrying said fuel vapor from said barrel to said carburetor which includes ports for permitting said fuel vapor containing partially oxidized fuel components to enter the carburetor and mix with the attenuated air-fuel mixture entering an internal combustion engine.

2. A fuel supply installation according to claim 1, wherein said barrel is provided with a partition defining, in the space of said barrel, a lower chamber in which combustion of the fuel liquid from the fuel liquid supply nozzle takes place to produce combustion gases, and an upper chamber provided with a further fuel liquid supply nozzle supplying a liquid fuel through a third fuel supply line branched from the second fuel supply line, said upper chamber being interconnected to the lower chamber through an aperture formed in a part of the partition so that the liquid fuel from the further fuel liquid supply nozzle is heated by said combustion gases entering into said upper chamber through said aperture thereby generating said fuel vapor.

3. A fuel supply installation according to claim 2, in which said fuel vapor generating means is disposed underneath said intake manifold, and wherein said upper chamber of said barrel of said fuel vapor generating means is provided with thermal exchange fins extending from said intake manifold to effect thermal exchange on the surface of said fins when said fuel vapor flow contiguous said surfaces.

4. A fuel supply installation according to claim 2, in which said air injecting means comprises an air pump having an operative association with an internal combustion engine to be driven by the engine, the air pump being provided with a pump inlet connected to the atmosphere and a pump outlet from which air is pumped out in response to the operation of the engine, a surge tank in which the air to be injected into the lower chamber of said barrel is fed by said air pump, and an air control valve unit for controlling the amount of the air fed into the surge tank from the air pump in response to the magnitude of a negative pressure existing in the intake manifold, further comprising means for controlling the amount of the liquid fuel supplied to said first and second fuel liquid supply nozzles in response to changes in the air pressure existing in said surge tank.

5. A fuel sypply installation according to claim 4, wherein said fuel flow control unit comprises: a control body having at least one round port for conveying the liquid fuel from said fuel tank into the control body, an extended port for exhausting the liquid fuel of the control body toward said first and second fuel liquid supply nozzles, and a piston slidably fitted in said control body and capable of controllably changing the opening area of said extended port in response to the sliding motion of said piston in said control body, and; a diaphragm unit associated with said piston of said control body to actuate said sliding motion of said piston, the diaphragm unit being connected to said surge tank thereby controlling the amount of said sliding motion of said piston in response to the amount of change in the air pressure existing in said surge tank.

6. A fuel supply installation according to claim 5, wherein said control body is provided with a further round port which enables return of an excess liquid fuel from said control body to said fuel tank via a fuel line when said opening area of said extended port is reduced by said piston.

7. A fuel supply installation according to claim 5, further comprising means for sensing change in temperature of the internal combustion engine, said sensing means controlling said sliding motion of said piston in said control body in response to the sensed change in temperature of said internal combustion engine.

8. A fuel supply installation according to claim 1, further comprising pressure regulating means for constantly maintaining the pressure of said fuel vapor substantially at an atmospheric pressure level before said fuel vapor reaches said carburetor, said regulating means being disposed in said conduit means.

9. A fuel supply installation according to claim 8, wherein said pressure regulating means comprises: a diaphragm member which separates first and second housed chambers from each other, the first chamber being fluidly connected to the atmosphere, the second chamber being fluidly connected to said carburetor via said conduit means, and; a valve operatively associated with said diaphragm member for providing a connection between said fuel vapor generating means and said carburetor when said diaphragm member is displaced toward said first chamber from said second chamber under the effect of a differential pressure acting on said diaphragm member, said valve interrupting said connection when the pressure in said second chamber is higher than the atmospheric pressure in said first chamber.

10. A fuel supply installation for a multi-cylinder type internal combustion engine comprising:

a fuel tank; a carburetor for producing a very lean mixture having a predetermined value of air-fuel ratio; an intake manifold on which the carburetor is mounted, an additive fuel vapor generator for producing an additive fuel vapor containing partially oxidized fuel components, said generator including a lower combustion barrel which is provided with a closed internal end to which a first nozzle member for supplying the lower combustion barrel with a liquid fuel, an air injector and an electric spark ignition plug are attached, the opposite end of said combustion barrel having an aperture, and a mixing barrel provided so that one end of the mixing barrel is adjacent to said opposite end of said combustion barrel, the opposite end of said mixing barrel being located adjacent to and underneath said intake manifold, and the side wall of said mixing barrel having attached thereto an outlet tube and a second nozzle member for supplying said mixing barrel with a liquid fuel; an air pump operatively associated with the internal combustion engine for feeding pumped air to said air injector of said additive fuel vapor generator; a fuel flow control unit associated with said air pump to control the amount of liquid fuel fed to said first and second fuel liquid supply nozzles in response to changes in the amount of air supplied to said air injector from said air pump; a fuel pump supplying said carburetor and the fuel flow control unit with liquid fuel from said fuel tank; a pressure regulator introducing therein the fuel vapor produced in said additive fuel vapor generator through said tube of said mixing barrel and regulating the pressure of said fuel vapor to substantially atmospheric pressure level, and; an additive fuel vapor feeder for enabling the pressure regulated fuel vapor coming from said pressure regulator to be sucked into said carburetor in response to the speed and the load of the engine as well as to be mixed with the very lean mixture.

11. A fuel supply installation according to claim 10, wherein the air-fuel ratio of the very lean mixture produced by said carburetor is established at a value of between 20 and 40.

* * * * *